United States Patent [19]

Yamamoto et al.

[11] Patent Number: 5,007,885
[45] Date of Patent: * Apr. 16, 1991

[54] DRIVING TORQUE TRANSMITTING DEVICE

[75] Inventors: Masaji Yamamoto; Shigeo Tanooka, both of Okazaki; Toshifumi Sakai, Aichi, all of Japan

[73] Assignee: Toyoda Koki Kabushiki Kaisha, Kariya, Japan

[*] Notice: The portion of the term of this patent subsequent to Mar. 6, 2007 has been disclaimed.

[21] Appl. No.: 453,190

[22] Filed: Dec. 19, 1989

Related U.S. Application Data

[63] Continuation of Ser. No. 227,806, Aug. 3, 1988, abandoned.

[30] Foreign Application Priority Data

Aug. 3, 1987 [JP] Japan ................... 62-193908
Aug. 19, 1987 [JP] Japan ................... 62-205550

[51] Int. Cl.$^5$ .......................................... F16H 1/44
[52] U.S. Cl. .................................. 475/231; 192/57; 192/103 F
[58] Field of Search .................. 475/231, 233, 234; 192/57, 103 F

[56] References Cited

U.S. PATENT DOCUMENTS

| | | | |
|---|---|---|---|
| 3,490,312 | 1/1970 | Seitz et al. | 74/711 |
| 3,534,633 | 10/1970 | Chocholek | 74/711 |
| 3,628,399 | 12/1971 | Seitz et al. | 74/711 |
| 4,012,968 | 3/1977 | Kelbel | 74/711 |
| 4,013,154 | 3/1977 | Brown | 192/58 B |
| 4,031,780 | 6/1977 | Dolan et al. | 74/711 |
| 4,040,271 | 8/1977 | Rolt et al. | 74/711 X |
| 4,048,872 | 9/1977 | Webb | 74/711 |
| 4,058,027 | 11/1977 | Webb | 74/711 |
| 4,096,712 | 6/1978 | Webb | 192/58 B X |
| 4,369,671 | 1/1983 | Matsumoto et al. | 74/665 GA |
| 4,444,298 | 4/1984 | Stangroom | 192/58 B X |
| 4,650,028 | 3/1987 | Eastman et al. | 74/650 |
| 4,662,499 | 5/1987 | Jordan | 74/711 X |
| 4,667,534 | 5/1987 | Kataoka | 74/711 |
| 4,719,998 | 1/1988 | Hiramatsu et al. | 192/103 F |
| 4,727,966 | 3/1988 | Hiramatsu et al. | 192/85 AA |
| 4,784,016 | 11/1988 | Masuda et al. | 74/650 |

FOREIGN PATENT DOCUMENTS

| | | |
|---|---|---|
| 0202951 | 11/1986 | European Pat. Off. |
| 0236650 | 9/1987 | European Pat. Off. ........... 74/711 |
| 3545540 | 7/1987 | Fed. Rep. of Germany . |
| 3706075 | 8/1987 | Fed. Rep. of Germany . |
| 176117 | 11/1949 | Japan . |
| 2163107 | 2/1986 | United Kingdom . |
| 2171967 | 9/1986 | United Kingdom . |

OTHER PUBLICATIONS

Patent Abstracts of Japan unexamined application Kokai-No. 60-252 026; vol. 10, No. 122, May 7, 1986.

Primary Examiner—Rodney H. Bonck
Assistant Examiner—Ryan Massey
Attorney, Agent, or Firm—Oblon, Spivak, McClelland, Maier & Neustadt

[57] ABSTRACT

A driving torque transmitting device which has a differential case to which driving torque of an engine is transmitted. Within the differential case, a pair of side gears meshed with pinion gears are disposed around right and left axle shafts so as to be axially slidable thereon. Two annular pistons are disposed between the side gears and end walls of the differential case in contact with the side gears so as to be rotatable with and axially slidable on the differential case to form two annular closed actuating chambers with the end walls of the differential case. Within the closed actuating chambers are disposed two blade plates so as to rotate respectively with the two axle shafts whereby the actuating chambers are divided into two spaces. These two spaces are charged with high-viscosity oil. Due to the relative rotation of the two axle shafts and the differential case, high pressure is generated in the closed actuating chambers to push the pistons toward the side gears so that the side gears are tightly engaged with the pinion gears. Accordingly, the two axle shafts start rotating integrally with the differential case.

5 Claims, 5 Drawing Sheets

DRIVING TORQUE TRANSMITTING DEVICE

This application is a continuation of application Ser. No. 227,806, filed on Aug. 3, 1988, now abandoned.

BACKGROUND OF THE INVENTION

1. Field of the Invention

The present invention relates to a driving torque transmitting device and more particularly to a driving torque transmitting device suitably employed in a four wheel drive car.

2. Description of the prior art

Four wheel drive(4WD)cars can run through snowy roads and rough roads with excellent stability by distributing driving torque to front and rear four wheels. These 4WD cars have been used as so-called off road cars. And while they are running on well-conditioned roads, 4WD has been changed to 2WD to prevent tight corner braking phenomenon or the like by manually operating a select lever.

Recently, the running performance of normal road cars has been demanded to be improved and 4WD has been employed in these cars for complying with the above demand. Under the above circumstances, there has been dynamically developed such a driving torque distributing device as to substantially disconnect front and rear wheels or right and left wheels from each other while running on well-conditioned roads without troublesome manual operation of the select lever.

As one example of the above described driving torque distributing device, there has been proposed the device provided with a viscous coupling by which axle shafts are brought into a nearly directly coupled condition only when a large difference in the number of rotation is generated between the axle shafts. This device is comparatively simple in structure, but it is difficult to obtain remarkable effect of 4WD since the axle shafts are not coupled to each o&her mechanically.

U.S. Pat. No. 2,949,792 discloses a differential assembly exhibiting remarkable 4WD effect, wherein pump assemblies, each being composed of a plurality of gears, pistons, clutch plates to be compressed by the pistons are provided within a differential case. When a large difference in the number of rotation is generated between axle shafts, the pump assemblies are operated to supply high pressure oil to the pistons. Then, the clutch plates are compressed to mechanically couple the axle shafts to the differential case.

However, the structure of the differential assembly of U.S. Pat. No. 2,949,792 is very complex and it is required to form a plurality of passages in the differential case for conveying pumped fluid from the pump assemblies to the distant pistons. Accordingly, this differential assembly has problems that the overall device becomes large and complex and that the production cost thereof is expensive.

SUMMARY OF THE INVENTION

It is an object of the present invention to provide a driving torque transmitting device which is capable of automatically selecting the separation or mechanical coupling of shafts with a simple and small-sized structure.

It is another object of the present invention to provide a driving torque transmitting device which does not require any pressure transmitting means between a pressure generating portion and a piston to be actuated by the generated pressure.

The driving torque transmitting device according to the present invention has a cylindrical case body connected to an input shaft to which driving torque is transmitted from a driving torque supply so as to be rotatable about an axis of the case body, at least one output shaft, one end of which penetrates a center of one end wall of the case body and is disposed rotatably relative to the case body, at least one first engaging member provided on an outer surface of the one end of the at least one output shaft so as to be rotatable with and axially slidable relative to the at least one output shaft, at least one second engaging member provided within the case body so as to be rotatable with the case body in contact with the at least one first engaging member, at least one piston member provided on an outer surface of the one end of the at least one output shaft in contact with the at least one first engaging member so as to axially divide a cavity within the case body to form a closed actuating chamber charged with high-viscosity fluid together with a radially extending wall formed integrally with the case body, the at least one piston member being rotatable with and axially slidable relative to the case body, and at least one blade member disposed within the closed actuating chamber so as to divide the closed actuating chamber in its circumferential direction, the at least one blade member rotating with the at least one output shaft.

When a motor vehicle runs straight, the case body and the at least one output shaft rotate at substantially the same speed as each other without substantial relative rotation therebetween. Therefore, driving torque is transmitted from the case body to the at least one output shaft thereby not to substantially separate the at least one output shaft from the case body.

When the at least one output shaft becomes stationary, the case body and the at least one output shaft rotate relative to each other so that the at least one blade member rotates within the closed actuating chamber to build up high pressure in the high viscosity fluid therein. Due to this high pressure, the at least one piston member is axially moved to tightly engage the at least one first engaging member with the at least one second engaging member and mechanically couple the at least one output shaft to the case body. As described above, according to the present invention, the separation or mechanical coupling of shafts can be automatically selected with a simple and small-sized structure.

BRIEF EXPLANATION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 8 is a view illustrating a driving system for heel drive car;

DETAILED DESCRIPTION OF THE PREFERRED EMBODIMENTS

Hereinafter, the present invention will be explained in accordance with the embodiments with reference to the drawings.

Figure 3:
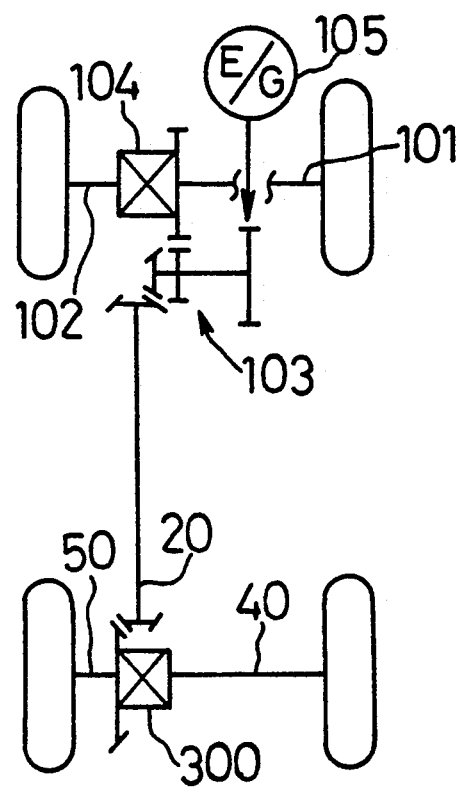

FIG. 3 illustrates a driving system for a 4WD car, provided with a driving torque transmitting device 300 according to the present invention.

In FIG. 3, driving torque of an engine 105 is transmitted to a right front axle shaft 101 and a left front axle shaft 102 via a gear train 103 and a well known differential gear mechanism. Driving torque of the engine 105 is also inputted to the driving torque transmitting device 300 of the present invention by way of the gear train 103 and a propeller shaft 20. The driving torque transmitting device 300 distributes the inputted driving torque to a right rear axle shaft 40 and a left rear axle shaft 50.

A first embodiment of the driving torque transmitting device according to the present invention will be explained in detail with reference to FIGS. 1 and 2.

Figure 1:
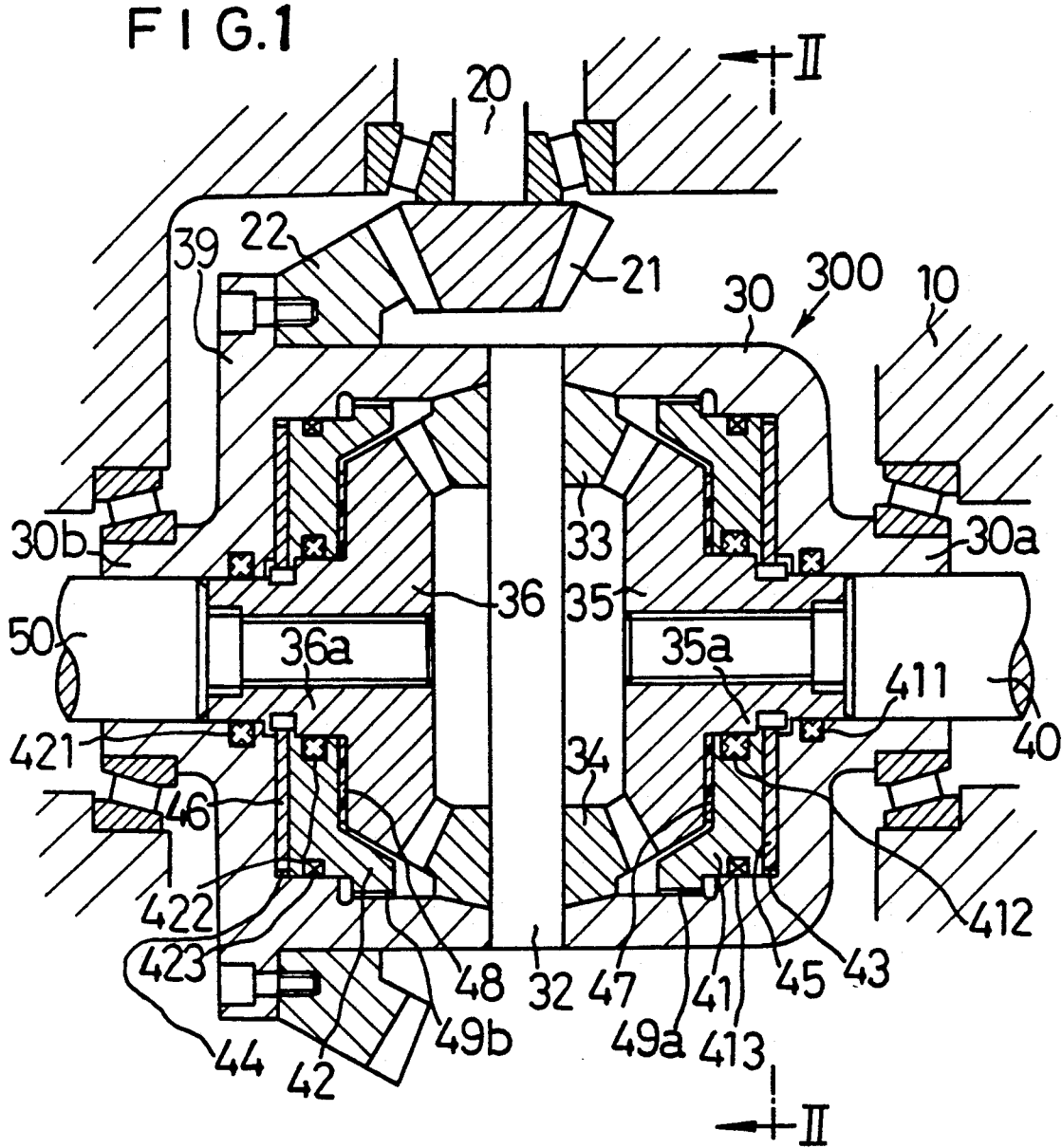
FIG. 1 is a sectional view of t he first embodiment of the driving torque transmitting device.
Figure 2:
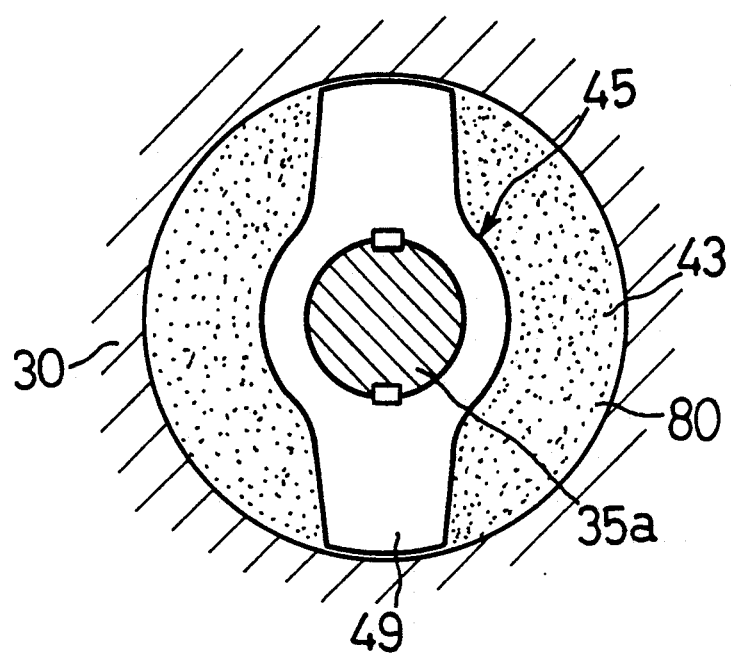
FIG. 2 is a sectional view taken along the line II—II of FIG. 1.

In FIG. 1, the driving torque transmitting device 300 has a differential case 30 of a cylindrical sectional shape, which is rotatably supported by an axle housing 10. The differential case 30 is connected to the propeller shaft 20 as an input shaft through an input gear 21 formed at an end of the propeller shaft 20, and a ring gear 22 bolted to an annular flange 39 of the differential case 30.

The differential case 30 is composed of a cylindrical wall portion and annular end walls, each having a sleeve 30a or 30b extending outwards so as to be coaxial with the differential case 30. To the cylindrical wall portion of the differential case 30 are fixed both ends of a pinion shaft 32 in a direction perpendicular to the axial direction of the differential case 30. A first pair of bevel gears 33 and 34 (pinion gears) are rotatably disposed on both end portions of the pinion shaft 32.

Within the differential case 30 are also disposed a second pair of bevel gears 35 and 36 (side gears) meshed with the pinion gears 33 and 34. Each of shaft portions 35a and 36a of the side gears 35 and 36 extends in the axial direction of the differential case 30 so as to be coaxial with each other.

The right and left axle shafts 40 and 50 are received by the sleeves 30a and 30b and coaxially splined to the shaft portion 35a and 36a, respectively.

Annular pistons 41 and 42 are disposed within cavities defined by the inner surfaces of the differential case 80 and the outer surfaces of the respective side gears 35 and 36.

The piston 41 is connected to the internal surface of the cylindrical wall portion of the differential case 30 by splines 49a so as to be rotatable with and axially slidable relative to the differential case 30. And the piston 41 is also axially slidable on the outer surface of the shaft portion 35a of the side gear 35. A thrust bearing 47 produced of, for example, TEFLON is interposed between the side gear 35 and one end surface of the piston 41 to usually allow the piston 41 to rotate with the differential case 30 while sliding on the side gear 35.

The other end surface of the piston 41 and the inner surface of the annular end wall of the differential case 30 define a closed actuating chamber 43 which is sealed with respect to the shaft portion 35a by seal rings 411 and 412, and with respect &o the differential case 30 by a seal ring 413.

Within the closed actuating chamber 43, a blade plate 45 is connected to the outer surface of the shaft portion 35a of the side gear 35 by key so as to rotate together with the side gear 35 and relative to the differential case 30. As shown in FIG. 2, the blade plate 45 is provided with two blades 49 of a thickness slightly thinner than the width of the actuating chamber 43, which radially extend in opposed directions close to the internal wall of the differential case 30 to divide the closed actuating chamber 43 into two spaces. These two spaces of the closed actuating chamber 43 are charged with high-viscosity oil 80 such as silicone oil.

The piston 42 is also provided so as to rotate together with the differential case 30 by means of splines 49b while circumferentially sliding on the side gear 36 through a thrust bearing 48 in substantially the same manner as that of the piston 41. The blade plate 46 has substantially the same construction as that of the blade plate 45, and is provided in a closed actuating chamber 44 sealed by seal rings 421, 422 and 423 similarly to the aforementioned chamber 43.

The operation of the driving torque transmitting device 300 having the above described construction will be explained with reference to various situations of a motor vehicle.

In the situation where the motor vehicle runs straight or rounds a curve, normal differential action is performed by the driving torque transmitting device 300.

When the motor vehicle runs straight, driving torque transmitted to the differential case 30 through the propeller shaft 20, the input gear 21 and the ring gear 22 causes rotation of the differential case 30 and the pinIon gears 33 and 34 about the axis of the differential case 30 without rotation of the pinion gears 33 and 34 about the pinion shaft 32. This results in the side gears 35 and 86 rotating with the differential case 30 to cause rotation of the axle shafts 40 and 50 at the same speed.

When the motor vehicle rounds a curve, the pinion gears 33 and 34 rotate about the pinion shaft 32 to alloy the side gears 35 and 36 to rotate relative to each other. This enables relative rotation of the rear axle shafts 40 and 50, and smooth rounding of the motor vehicle.

Next, in the situation where a left wheel(not shown) slips on a slippery road surface while a right wheel(not shown) becomes stationary on a dry road surface, for example, the left axle shaft 50 idles and rapidly rotates while the right axle shaft 40 is stationary. In this situation, the blade plate 45 connected to the right axle shaft 40 by key is stationary while the blade plate 46 connected to the left axle shaft 50 by key rapidly rotates. This results in, relative to the differential case 30 to which driving torque is transmitted, rotating of the blade plates 45 and 46 to a large degree. This large relative rotation of each of the blade plates 45 and 46 to the differential case 30 causes the movement( of high-viscosity oil 80 within the closed actuating chambers 43 and 44. At this time, this high-viscosity oil 80 receives viscosity frictional resistance from the inner surfaces of the annular end walls of the differential case 30 and the other end surfaces of the piston 41 and 42, and accordingly, a rising pressure gradient is produced in the high-viscosity oil 80 from the preceding blade 49 toward the succeeding blade 49 in the direction of the rotation of the blade plates 45 and 46 relative to the differential case 30.

The pressure of the high-viscosity oil 80 in the closed actuating chambers 43 and 44 increases in proportion to the speed of relative rotation of the blade plates 45 and 46.

The pressurized high viscous oil 80 forces the pistons 41 and 42 to push the side gears 35 and 36. This results in the side gears 35 and 36 pushed by the pistons 41 and 42 being tightly engaged with the pinion gears 33 and 34 to restrain the rotation of the pinion gears 33 and 34 about the pinion shaft 32. Accordingly, the stationary axle shaft 40 begins to rotate with the differential case 30 while the rapidly rotating axle shaft 50 is slowed down to the rotating speed of the differential case 30. Thus, the axle shafts 40 and 50 rotate together at the same speed, and the motor vehicle returns to its normal operation.

In the first embodiment, the device of the present invention is used as a driving torque transmitting device for rear use. But the device of the present invention may be used also as a driving torque transmitting device for center use which transmits the driving torque to front and rear wheels and also as a driving torque transmitting device for front use which transmits the driving torque to right front and left front wheels.

Moreover, as another modificaton, blade plates may be rotatably connected to the outer periphery of the output shafts with the shaft portions of the side gears eliminated.

As described above, the driving torque transmitting device of the first embodiment can be embodied by providing the closed actuating chambers provided with the blade plates in the spaces between the differential case and the side gears of the differential device. By utilizing the pressure gradient produced in the high-viscosity oil due to the rotation of the blade plates relative to the differential case, high pressure can be efficiently obtained. Therefore, a large-sized and complex mechanism for generating pressure to lock the differential action is not needed.

Thus, the device of the present embodiment can carry out both the differential action in a normal driving situation on a dry road, and the differential locking action in the driving situation on a slippery road, with a simple and a small-sized structure.

A second embodiment of the driving force transmitting device 300 according to the present invention will be explained with reference to FIGS. 4 and 5. The device of the second embodiment is also applied to the rear axle shafts 40 and 50 of a motor vehicle schematically shown in FIG. 8, similarly to the first embodiment.

Figure 4:
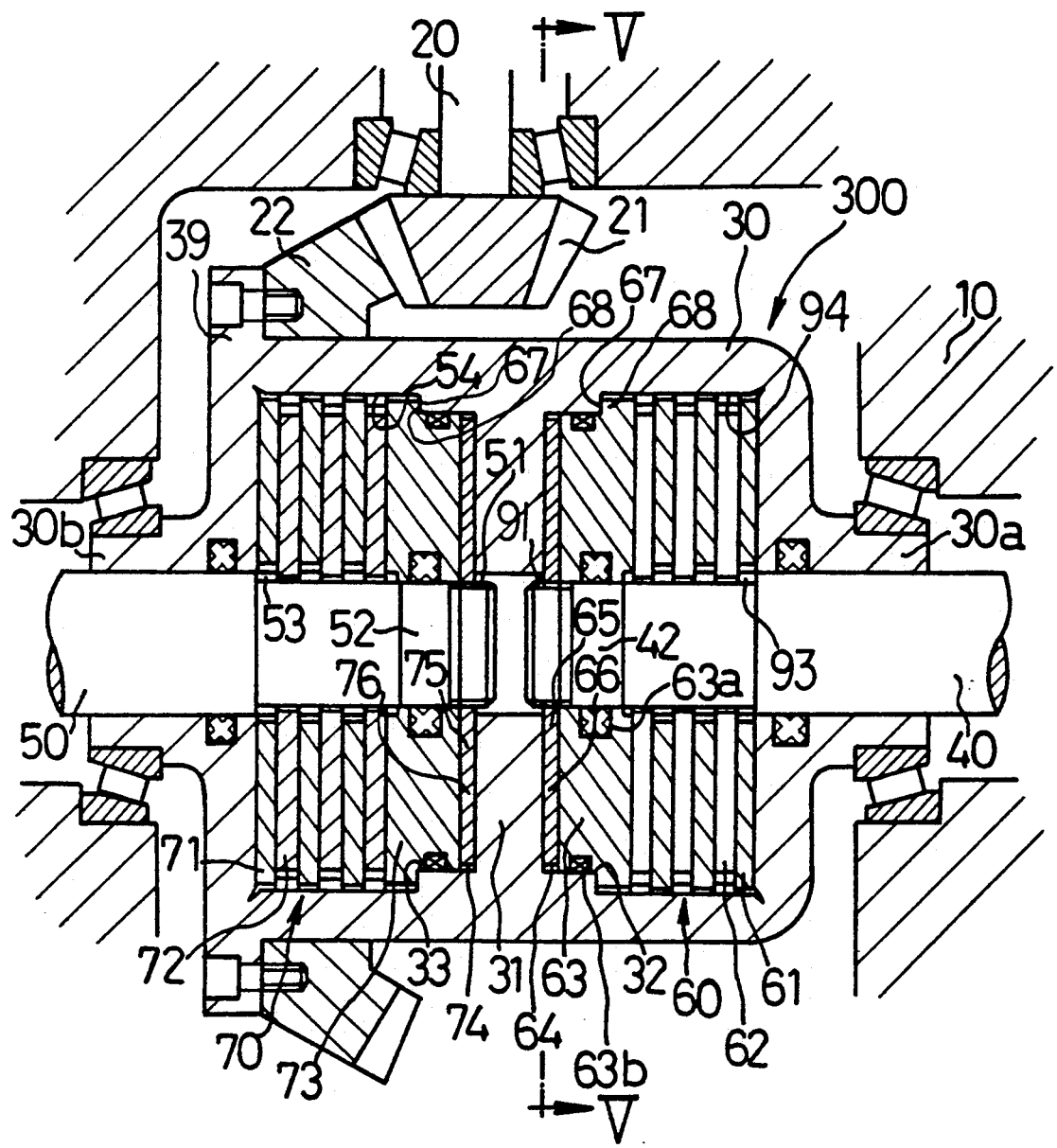
FIG. 4 is a sectional view of the second embodiment of the driving torque transmitting device.

In FIG. 4, a differential case 30 having a cylindrical sectional shape, is supported by an axle housing 10 so as to be rotatable in a direction perpendicular to the rotation axis of the propeller shaft 20. The rotation of the propeller shaft 20 is transmitted to the differential case 30 through an input gear 21 formed at an end of the propeller shaft 20, and a ring gear 22 bolted to an annular flange 39 of the differential case 30.

The differential case 30 is composed of a cylindrical wall portion and annular end walls, each having a sleeve 30a or 30b extending outwards so as to be coaxial with the differential case 30.

An annular partition wall 31 is integrally formed with the cylindrical wall portion of the differential case 30 at an axially intermediate position thereof so as to divide the inner cavity of the differential case 30 into two chambers 32 and 33 of the same size.

The rear right axle shaft 40 and the rear left axle shaft 50 are inserted from the sleeves 30a and 30b, into the chambers 32 and 33 of the differential case 30, respectively, so as to be coaxial with each other.

In the outer surface of an end portion of the axle shaft 40 is formed a first spline 91 while in the outer surface of a nearly half-length portion thereof within the differential case 30 is formed a second spline 93. A plurality of annular inner plates 62(three in the drawing) are connected to the axle shaft 40 by the second spline 93 so as to be rotatable together with the axle shaft 40 and slidable thereon in the axial direction thereof.

In the internal surface of the cylindrical wall portion of the differential case 30 is formed a third spline 94. A plurality of annular outer plates 61(three in the drawing) are connected to the differential case 30 by the third spline 94 so as to be rotatable together with the differential case 30 and slidable thereon in the axial direction thereof. The outer plates 61 and the inner plates 62 are alternately disposed within the chamber 32 in the axial direction of the differential case 30 to compose a multiple disc clutch 60.

An annular piston 63 is disposed inside the innermost inner plate 62 and is connected to the differential case 30 by the third spline 94 so as to be rotatable together with the differential case 30 and slidable thereon in the axial direction thereof. The inner peripheral surface of the piston 63 is in slidable contact with the outer surface of the axle shaft 40.

An end surface of the piston 63 and one end surface of the partition wall 31 define a closed actuating chamber 64 which is sealed with respect to the axle shaft 40 and the differential case 30 by sealing rings 63a and 63b, respectively.

Within the closed actuating chamber 64, a blade plate 65 is connected to the axle shaft 40 by the first spline 64 so as to be rotatable together with the axle shaft 40 and slidable thereon in the axial direction thereof.

Figure 5:
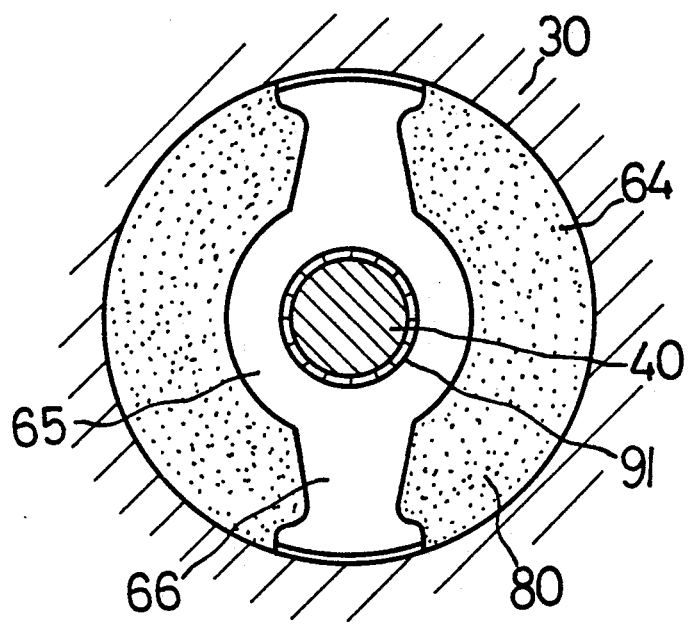
FIG. 5 is a sectional view taken along the line V—V of FIG. 4.

As shown in FIG. 5, the blade plate 65 is provided with two blades 66 of a thickness slightly thinner than the width of the actuating chamber 64, which radially extend in opposed directions close to the internal wall of the differential case 30 to divide the closed chamber 64 into two spaces. The two spaces of the closed actuating chamber 64 are charged with high-viscosity oil 80 such as silicone oil.

In the outer surface of the axle shaft 50 is formed splines 51 and 53 while in the internal surface of the differential case 30 is also formed a spline 54. A plurality of outer plates 71 and a plurality of inner plates 72 comprise another multiple disc clutch 70, are disposed within the chamber 33 and are connected to the differential case 30 and axle shaft 50, respectively, by the splines 53 and 54 similarly to the outer plate 61 and the inner plate 62. An annular piston 73 is connected to the differential case 30 by the spline 54 in slidable contact with the axle shaft 50. Within a closed actuating chamber 74 defined by the piston 73 and the partition wall 31 is disposed a blade plate 75 having two opposed blades 76, which is connected to the axle shaft 50 by the spline 51 similarly to the blade plate 65.

Stepped portions 67 are formed in the internal surface of the cylindrical wall portion of the differential case 30 while stepped portions 68 are formed in the outer surface of the pistons 63 and 73 so as to abut on the stepped portions 67. These stepped portions 67 and 68 prevent the pistons 63 and 73 from moving toward the blade plates 63 and 75 over a predetermined distance, respectively.

The operation of the driving torque transmitting device 300 of the second embodiment having the above described construction will be explained with reference to various situations of a motor vehicle.

In the situation where the motor vehicle is started, driving torque is transmitted to the differential case 30 through the propeller shaft 20, the input gear 21 and the ring gear 22 to rotate the differential case 30. This results in each of the blade plates 65 and 75 rotating relative to the partition wall 31 of the differential case 30. This relative rotation of each of the blade plates 65 and 75 and the partition wall 31 causes the movement of high-viscosity oil 80 within each of the closed actuating chambers 64 and 74. At this time, this high-viscosity oil 80 receives viscosity frictional resistance from each of end surfaces of the partition wall 31 and each of the end surfaces of the pistons 63 and 73, and accordingly, a rise in pressure gradient is produced in the high-viscosity oil 80 from each of the preceding blades 66 and 76 toward each of the succeeding blades 66 and 76 in the direction of the rotation of each of the blade plates 65 and 75 relative to the partition wall 31.

The pressure of the high-viscosity oil 80 in the actuating chambers 64 and 74 increases in proportion to the speed of relative rotation of the blade plates 65 and 75.

The pressurized high-viscosity oil 80 forces each of the pistons 63 and 73 to push each of the innermost inner plates 62 and 72 so that the inner plates 62 and 72 and the outer plate 61 and 71 are pressed to come in contact with each other. This results in the rotation of the differential case 30 being transmitted to the axle shafts 40 and 50 through the inner plates 62 and 72 and the outer plates 61 and 71 of the multiple disc crutches 60 and 70, and rear wheels(not shown) starting rotating.

In the situation where the motor vehicle runs straight, the blade plates 65 and 75 rotate relative to the partition wall 31 to the same degree as each other, and accordingly the axle shafts 40 and 50 rotate at the same rotating speed slightly lower than that of the differential case 30.

In the situation where the motor vehicle rounds a curve, smooth rounding is realized since the relative rotation of the axle shafts 40 and 50 is allowed to some extent.

In the situation where a left wheel(not shown) slips on a slippery road surface while a right wheel(not shown)becomes stationary due to unbalance of load, for instance, the right axle shaft 40 is stationary, and the blade plate 65 rotates relative to the partition wall 31 of the differential case 30 to produce a pressure gradient in the high-viscosity oil 80 and to build up higher pressure in the high-viscosity oil 80 prior to the succeeding blade 66 similarly to the motor vehicle starting situation. Due to this higher pressure of the oil 80, the piston 63 is pushed strongly toward the multiple disc clutch 60. As a result, the driving torque is transmitted to the stationary axle shaft 40 from the differential case 30, and the motor vehicle returns to its normal drivIng condition.

In the second embodiment, the blades 65 and 75 and the pistons 63 and 73 are provided on the side of the partition wall 31. They may be on the opposite side of the partition wall 31, namely, on the side of the end walls of the differential case 30.

In the second embodiment, the number of the outer plates 61 and 71, and the inner plates 62 and 72 may be increased or decreased in accordance with the magnitude of the driving torque to be transmitted. It is not necessarily required to provide a plurality of outer plates and inner plates.

As described above, the driving torque transmitting device of the second embodiment has an operational effect similar to that of the first embodiment.

The driving torque transmitting device of the second embodiment has no differential action, but the structure thereof can be made smaller and simpler as compared with the first embodiment of the device according to the present invention.

What is claimed is:

1. A driving torque transmitting device for transmitting driving torque from a driving torque supply to two output shafts connected to wheels, comprising:

an input shaft rotatably supported on a housing to be rotated by said driving torque supply and provided with an input gear at its one end;

a cylindrical case body supported within said housing so as to be rotatable about a rotational axis perpendicular to the rotational axis of said input shaft and provided on its outer periphery with a ring gear meshing said input gear each other so as to be rotated;

two output shafts arranged to be rotatable about an axis coinciding with said rotational axis of said cylindrical case body, each end of said two output shafts penetrating end walls of said case body;

two first engaging members each provided on an outer surface of said ends of said output shafts so as to be rotatable with and axially slidable relative to said output shafts;

two second engaging members provided within said case body in contact with each of said first engaging members;

two piston members each provided on an outer surface of said ends of said output shafts in contact with respective first engaging members so as to form two closed actuating chambers charged with viscous fluid together with two radially extending walls formed integrally with said case body; said piston members being rotatable with and axially slidable relative to said case body; and two blade members each being rotatable bodily with each of said output shafts and disposed within each of said closed actuating chambers in relative slidable contact relation with said piston members, each of said blade members having an axial width which is narrower in an axial direction than said closed actuating chambers so that upon rotation of each of said blade members respectively with said closed actuating chambers, a high pressure is generated due to said viscous fluid being compulsorily moved between two respective surfaces defining respectively said closed actuating chambers, so as to axially respectively move said piston members respectively toward said first engaging members and so as to tightly respectively engage the same with said second engaging members for torque transmission between respective output shafts and said case body, wherein each of said blade members includes at least two radially extending blade portions which are formed to provide a circumferential space section between every two blade portions of said at least two radially extending blade portions so as that a large volume of said viscous fluid is filled within said circumferential space sections.

2. The driving torque transmitting device as set forth in claim 1, wherein a length dimension of said circumferential space section in its circumferential direction is greater than that of said at least two radially extending blade portions.

3. A driving torque transmitting device according to claim 1, wherein said two second engaging members comprise a first pair of bevel gears disposed around a pinion shaft extending between opposed portions of a cylindrical wall of said differential case: said two first engaging members comprise a second pair of bevel gears provided around said two output shafts respectively so as to be meshed with said first pair of bevel gears, said radially extending wall comprises each of the end walls of said differential case, said two piston members are disposed between said respective second pair of bevel gears and said respective end walls, to form said closed actuating chambers with said end walls, wherein when each of said two output shafts rotate relative to said differential case, said two piston members axially move due to high pressure generated in said closed actuating chambers to tightly engage said second pair of bevel gears with said first pair of bevel gears and to restrain relative rotations of said respective two output shafts and said differential case.

4. A driving torque transmitting device according to claim 1, wherein each of said two second engaging members is composed of at least one ring-shaped outer plate connected to an inner wall of said differential case at its outer periphery, each of said two first engaging members comprise at least one ring-shaped inner plate connected to an outer surface of each of said two output shafts at its inner periphery in contact with said at least one outer plate, said radially extending wall comprises a partition wall dividing a cavity of said differential case at its axially intermediate position, and wherein each of said two piston members is disposed between an innermost one of said at least one inner plate and at least one outer plate and said partition wall to form said closed actuating chamber with said partition wall, wherein when each of said two output shafts rotates relative to said differential case, each of said two piston members axially moves due to high pressure generated in said closed actuating chamber to tightly engage said at least one inner plate with said at least one outer plate and restrain relative rotation of each of said two output shafts and said differential case.

5. A driving torque transmitting device according to claim 4, wherein said at least one inner plate is composed of a plurality of inner plates and said at leas one outer plate is composed of a plurality of outer plates, said plurality of inner plates and said plurality of outer plates are alternately disposed, and the outer periphery of each of said plurality of outer plates is connected to said inner wall of said differential case so as to be axially movable relative to said differential case.

* * * * *